June 13, 1944.   C. J. CONKLE   2,351,485
CONTROL DEVICE
Filed Dec. 9, 1940
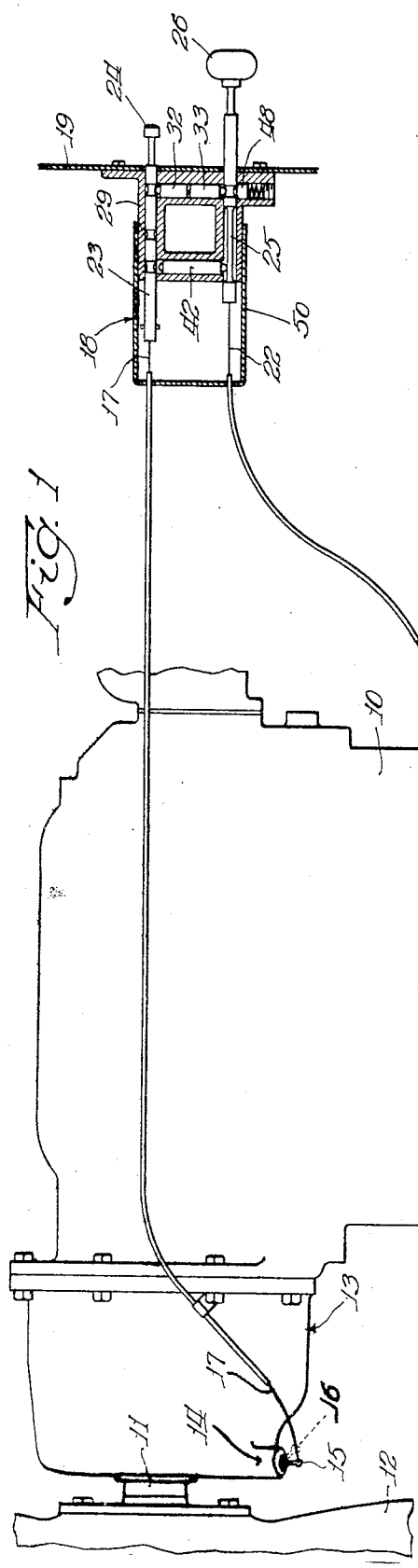
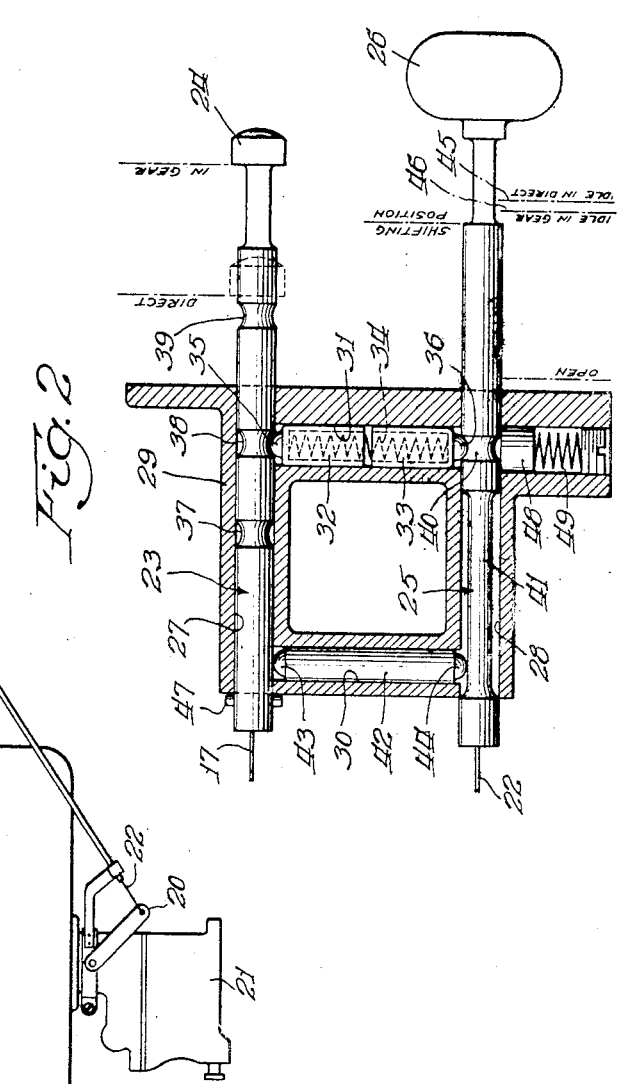
Inventor:
Carl J. Conkle
By:
Edward C. Britzbaugh
Atty Patented June 13, 1944

2,351,485

UNITED STATES PATENT OFFICE 2,351,485

CONTROL DEVICE

Carl J. Conkle, Muncie, Ind., assignor to Borg-Warner Corporation, Chicago, Ill., a corporation of Illinois Application December 9, 1940, Serial No. 369,171

11 Claims. (Cl. 170—135.5)

This invention relates to a control mechanism for a speed changing device. For purposes of illustration, this invention will be described with reference to a speed changing device for an airplane engine.

In a copending application of William E. Moffitt, Serial No. 359,987, filed October 7, 1940, which has matured into Patent 2,332,588, issued October 26, 1943, is described a two-speed transmission which is to be inserted in the drive between an airplane engine and a propeller to change the speed of the propeller relative to the engine. The purpose of the transmission is to enable the engine to rotate at a higher speed in an emergency, as when taking off, to secure the benefit of the greater power available at the higher engine speeds. Thus when used in a light plane, the transmission enables the plane to take off much more quickly with the same size engine, and makes possible a considerable reduction in wing area to attain a higher cruising speed if no improvement in take-off is desired.

The Moffitt transmission referred to above is controlled manually, the shift being effected by means of a hydraulic device which is controlled by a valve. Since the control is manual, the aviator may shift the transmission at speeds at which a shift would be undesirable or even dangerous. This is particularly true in the case of light planes, since pilots flying such planes may not have the proper background and experience to appreciate the undesirability or danger of making a shift at the wrong time and under the wrong conditions. A pilot may for example make a shift when the propeller is rotating at a relatively high speed and the down shift through the transmission would then result in a racing engine which of course, is extremely undesirable. The pilot might also make a shift to the reduced speed and then throttle his engine down to the usual idle throttle position, but in view of the reduced rotation of the propeller under such circumstances there might not be sufficient flywheel action available at this speed to keep the engine firing and the result then would be a stalled engine. If the latter condition were made to occur while the plane was in the air, unless the pilot could dive the plane and thereby secure enough wind-milling action to turn the engine over, he would have to make a forced landing.

The object of this invention is to provide an interlock between the speed controlling mechanism of an engine and the control mechanism of a speed reducing device associated with the engine which will coordinate the operation of the two control devices to prevent damage to either the engine or the speed reducing mechanism.

Another object of this invention is to provide a control for an airplane equipped with a speed reducing mechanism which will prevent the shifting of the transmission except under favorable conditions.

These and other objects of the invention will become apparent from the following description when taken together with the accompanying drawing, in which:

Fig. 1 is an assembly of an engine, a speed reducing mechanism associated with the engine and the novel control therefor, the controls being in section; and Fig. 2 is an enlarged section through the controls of Fig. 1.

Referring now to the drawing for a detailed description of the invention, 10 represents an internal combustion engine which is adapted to drive a shaft 11 to which may be secured a load such for example as propeller 12. Intermediate engine 10 and shaft 11 is a speed changing mechanism 13 the details of which are disclosed in William E. Moffitt application Serial No. 359,987, filed October 7, 1940 which has matured into Patent 2,332,588, issued October 26, 1943. Since the details of the speed changing mechanism 13 form no part of this invention, they will not be described herein. It will suffice for the purpose of this invention to state merely that transmission 13 is provided with a control valve 14 having two positions in one of which, 15, the transmission 13 is conditioned for direct drive, and in the other position 16 (shown dotted) the transmission is conditioned for reduced drive. By direct drive is meant a drive of shaft 11 and its associated propeller 12 at the same speed as engine 10 and by reduced drive is meant a drive of shaft 11 at a lesser speed than engine 10. The movement of valve 14 to its two different positions is effected by means of a Bowden wire 17 which passes rearwardly (to the right in Fig. 1) to the novel control mechanism 18 which is mounted on an instrument panel 19.

The speed of engine 10 is controlled by means of a throttle 20 on carburetor 21, the position of throttle 20 being determined by a Bowden wire 22 which likewise passes rearwardly to control 18.

Referring now to the enlarged view of control 18 to be found in Fig. 2, Bowden wire 17 terminates in a rod 23 which is provided at its free extremity with a knob 24. Similarly, Bowden wire 22 terminates in a rod 25 which is provided at its free end with a knob 26. Said rods 23 and 25 are mounted in suitable bores 27 and 28 respectively in a supporting casting 29. Said casting 29 is in the form of a rectangle with bores 27 and 28 passing through opposite parallel sides and with additional bores 30 and 31 contained in the connecting remaining sides.

Located in bore 31 are opposed poppets 32 and 33, which are hollowed to receive a compression spring 34 the function of which is to urge poppets 32 and 33 toward bores 27 and 28, respectively. The opposite ends 35 and 36 of poppets 32 and 33, respectively, are rounded off as shown in Fig. 2. Speed changing mechanism control rod 23 is provided with spaced annular notches 37, 38 and 39. Notches 38 and 39 are adapted to cooperate with rounded end 35 to provide two definite positions for control rod 23 in bore 27, notch 38 corresponding to the position in which transmission 13 is conditioned for reduced drive and notch 39 corresponding to the position which effects a direct drive.

Throttle control rod 25 is provided with a single annular notch 40 which is adapted to cooperate with rounded end 36 of poppet 33. Said throttle control rod 25 is provided with a relatively long section 41 of reduced diameter which is in the nature of an elongated notch corresponding to notch 37 of speed ratio controlling rod 23.

Poppets 32 and 33 are so arranged with respect to notches 38, 39 and 40 as to render the operation of rod 23 impossible at all times except when throttle control rod 25 is in its shifting position in which it is shown in full lines in Fig. 2. This position is determined from the characteristics of engine 10 and the speed reducing mechanism 13 and is intermediate engine idling and fully opened throttle positions, and this position corresponds to that position of throttle 20 which will produce a speed of rotation in engine 10 at which optimum conditions exist for effecting a speed ratio change in transmission 13. This position of course varies with the engine and transmission, the position for the transmission illustrated here and the engine for which it was designed corresponding to a speed of approximately 1200 R. P. M. If control rod 25 is in any other position, that is, if the speed of engine 10 is much lower or much higher than the optimum speed, poppets 32 and 33 will positively lock speed ratio controlling rod 23 in place and will prevent a change in speed ratio. In this case the poppet 33 will be out of notch 40, and the poppet 33 will hold the poppet 32 in the notch 38 of rod 23 corresponding to "in gear" condition of the transmission 13 or in the notch 39 of rod 23 corresponding to direct drive condition of the transmission and will thereby prevent movement of the rod 23.

It will be apparent thus far that poppets 32 and 33 determine the conditions under which a speed change will be made. The means by which the proper idling speed is determined for the speed ratio selected will now be described.

It will be noted that in bore 30 is located a plunger 42 which has rounded ends 43 and 44 which contact respectively gear control rod 23 and throttle rod 25. Plunger 42 is longer than the distance between bores 27 and 28 and is so arranged that rounded end 43 may cooperate with notch 37 and rounded end 44 may cooperate with elongated notch 41 either simultaneously or separately, but the ends cannot ride simultaneously on the other portions of the control rods 23 and 25.

Notch 37 is so located on control rod 23 that when the rod is pushed inward to the position corresponding to direct drive the notch is aligned with plunger 42. In direct drive, propeller 12 rotates at engine speed and accordingly the engine may be idled at a lower speed. Since notch 37 and elongated notch 41 cooperate with the ends of plunger 42 simultaneously when control rod 23 is positioned for direct drive, no restraint is imposed upon the movement of throttle rod 25 by plunger 42, and accordingly, the rod may be pulled outward to the "idle in direct" position indicated by dot-and-dash line 45. When throttle rod 25 is pulled out to this idle position, plunger 42 will lock rod 23 in place to prevent a shift into the low speed ratio. Assuming again that notch 37 and notch 41 are aligned with plunger 42, should control rod 23 be operated to place the transmission 13 in low speed ratio, then throttle control rod 25 may move to any one of a range of positions permitted by the length of notch 41. Said notch 41 is of such length that the lowest idle speed position permitted will be higher than the idle in direct. This position may be termed the "idle in gear" position and is indicated by a dot-and-dash line 46. In this position propeller 12 is rotated at a sufficient speed to keep engine 10 running.

The relative positions of plunger 42 and notches 37 and 41 when the transmission control rod 23 is in the direct drive position is shown in Fig. 1, while the "in gear" position is shown in Fig. 2.

Certain structural refinements may be added to the control mechanism such as pin 47 on rod 23, which prevents the rod from being pulled out too far, and drag shoe 48 which is held against throttle control rod 25 by means of a spring 49 to keep the throttle rod from working out of any selected position. A cover 50 helps support Bowden wires 17 and 22 and also protects the exposed ends of rods 23 and 25.

Although this invention has been described with reference to an interlock arranged between the throttle and transmission control, it may be adapted equally as well to function with some other control instead of the throttle.

It is understood that the foregoing description is merely illustrative of a preferred embodiment of the invention, and that the scope of the invention therefore, is not to be limited thereto but is to be determined by the appended claims.

I claim:

1. In combination a variable speed engine, a rotatable mass functioning as the flywheel of the engine, speed ratio changing mechanism interposed between the engine and mass, a control for the mechanism, a speed control for the engine, and means cooperating with said controls to provide a plurality of engine idling positions of said speed control from which the speed control cannot be moved for a lower speed to correspond with the various speed ratios whereby to rotate the mass at sufficient speed in all ratios under idling conditions of the engine to provide the engine with adequate flywheel action.

2. In combination a variable speed engine, a rotatable mass functioning as the flywheel of the engine, speed ratio changing mechanism interposed between the engine and mass, a control for the mechanism, a throttle for the engine, and means interlocking the throttle and control, said means providing a higher engine idling speed position of the throttle from which the throttle cannot be moved for a lower speed when the mechanism drives the mass at less than engine speed than when the mechanism drives the mass at substantially engine speed.

3. In combination an aircraft engine, a propeller, speed ratio changing mechanism interposed between the engine and propeller, a throttle for the engine, a control for the mechanism, an idle position for the throttle effective when the speed ratio through the mechanism is substantially at unity, and means preventing the throttle from assuming said idle position when the mechanism is set to drive the propeller at less than engine speed and providing a higher idle speed for the engine.

4. In combination, a variable speed engine, a rotatable mass functioning as the flywheel of the engine, speed ratio changing mechanism interposed between the engine and mass, a speed control for the engine, a control for the mechanism, means interlocking the controls to prevent a speed ratio change except at a predetermined setting of the speed control corresponding to the optimum speed of the engine for making a speed ratio change, and means cooperating with the controls to provide a plurality of engine idling positions of said speed control from which the speed control cannot be moved for a lower speed to correspond with the various speed ratios whereby to rotate the mass at sufficient speed in all ratios under idling conditions of the engine to provide the engine with adequate flywheel action.

5. In combination an aircraft engine, a propeller, speed ratio changing mechanism interposed between the engine and propeller, a throttle control rod for the engine, a control rod for the mechanism, notches on said rods, and a plunger cooperating with the notches, said notches being disposed on said rods to provide one engine idling speed position of the throttle rod from which the rod cannot be moved for a lower engine speed when the mechanism is conditioned for a reduced drive and another lower idling speed position when the mechanism is conditioned for the normal drive ratio.

6. In combination, an internal combustion engine having a throttle, a rotatable mass functioning as the flywheel of the engine, a speed ratio changing mechanism interposed between the engine and mass, a control for the mechanism for changing the speed ratio, and means for preventing a change in speed ratio by means of said control except at a certain optimum setting of said engine throttle intermediate its fully open and engine idling positions.

7. In combination, an internal combustion aircraft engine, a propeller, speed ratio changing mechanism interposed between the engine and propeller, a throttle for the engine, a control for the mechanism for changing the speed ratio, and means interlocking the throttle and mechanism control to prevent a change in speed ratio by means of said control except at a certain optimum setting of said engine throttle intermediate its fully open and engine idling positions.

8. In combination, an internal combustion aircraft engine, a propeller, speed ratio changing mechanism interposed between the engine and propeller, a control for the mechanism for changing the speed ratio, a throttle for the engine and having a certain optimum setting for a change in speed ratio, and means interlocking the throttle and mechanism control to prevent movement of said throttle from its said optimum setting while the speed ratio of said mechanism is being changed.

9. In combination, an aircraft engine, a propeller, speed ratio changing mechanism interposed between the engine and propeller, a control rod for the mechanism for changing the speed ratio and having a pair of spaced notches thereon corresponding to two speed ratios, a throttle rod for the engine and having a notch thereon, and poppet means adapted to fit in said notches to interlock the rods, said poppet means operating to prevent movement of either of said rods in either direction except when the other rod is so positioned for a notch thereon to receive the poppet means whereby the speed ratio can only be changed when the throttle rod is in a certain optimum position.

10. In combination, an aircraft engine, a propeller, speed ratio changing mechanism interposed between the engine and propeller, a control rod for the mechanism for changing the speed ratio and having a notch thereon, a throttle rod for the engine and having a notch thereon of greater length than said first named notch, and plunger means adapted for movement into either of said notches, said plunger means when said mechanism control rod is positioned to receive the plunger means in its notch permitting movement of the throttle rod freely of the plunger means whereby the throttle rod may be moved to a certain engine idling position and when the mechanism control rod is moved out of said position cooperating with the notch in the throttle rod to restrict movement of the throttle rod to a higher speed engine idling position.

11. In combination an aircraft engine, a propeller, speed ratio changing mechanism interposed between the engine and propeller, a control rod for the mechanism, a throttle rod for the engine, means providing an engine idling speed position of the throttle rod when the mechanism is conditioned for normal drive ratio, a plurality of notches on the control rod, a plurality of notches on the throttle rod, and spaced interlocking elements each adapted to cooperate with certain ones of said notches, one of said elements preventing a speed ratio change except at a predetermined throttle setting, and another of said elements providing a faster idle setting of the throttle rod from which the rod cannot be moved for a lower engine speed when the mechanism is conditioned for reduced drive.

CARL J. CONKLE.